(12) United States Patent
Schneider et al.

(10) Patent No.: US 10,852,999 B2
(45) Date of Patent: Dec. 1, 2020

(54) STORAGE SYSTEM WITH DECOUPLING OF REFERENCE COUNT UPDATES

(71) Applicant: EMC IP Holding Company LLC, Hopkinton, MA (US)

(72) Inventors: Zvi Schneider, Tel Aviv (IL); Uri Shabi, Tel Mond (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 11 days.

(21) Appl. No.: 16/050,926

(22) Filed: Jul. 31, 2018

(65) Prior Publication Data
US 2020/0042254 A1 Feb. 6, 2020

(51) Int. Cl.
*G06F 3/06* (2006.01)
*G06F 16/13* (2019.01)
*H04L 29/08* (2006.01)

(52) U.S. Cl.
CPC .......... *G06F 3/0688* (2013.01); *G06F 3/0619* (2013.01); *G06F 16/137* (2019.01); *H04L 67/1097* (2013.01)

(58) Field of Classification Search
CPC ... G06F 16/137; G06F 3/0688; G04L 67/1097
See application file for complete search history.

(56) References Cited

U.S. PATENT DOCUMENTS 4,716,524 A * 12/1987 Oxley ................ G06F 12/0261
711/219
7,444,464 B2 10/2008 Urmston et al.
(Continued)

FOREIGN PATENT DOCUMENTS

WO 2016111954 A1 7/2016

OTHER PUBLICATIONS

Deutsch et al "An Efficient, Incremental, Automatic Garbage Collector" Communications of the ACM vol. 19, Issue 9 Sep. 1976 [online] Retrieved from the Internet. Retrieved from <URL: https://dl.acm.org/doi/pdf/10.1145/360336.360345?download=true> (Year: 1976).*

(Continued)

*Primary Examiner* — David Yi
*Assistant Examiner* — Dustin B. Fulford
(74) *Attorney, Agent, or Firm* — Ryan, Mason & Lewis, LLP

(57) ABSTRACT

A storage system comprises a plurality of storage devices and an associated storage controller. The storage controller is configured to receive a request to copy a first range of logical addresses to a second range of logical addresses, determine at least one physical block of the storage devices to which the first range of logical addresses is mapped, map the second range of logical addresses to the determined at least one physical block, and add at least one content-based signature associated with the determined at least one physical block to a pending increment data structure that includes content-based signatures corresponding to physical blocks for which an increment of an associated reference count is pending. The storage controller is further configured to execute a pending increment of a reference count associated with a given physical block corresponding to at least one of the content-based signatures in the pending increment data structure.

20 Claims, 9 Drawing Sheets

(56) References Cited

U.S. PATENT DOCUMENTS

| | | | |
|---|---|---|---|
| 8,095,726 | B1 | 1/2012 | O'Connell et al. |
| 8,214,612 | B1 | 7/2012 | Natanzon |
| 9,104,326 | B2 | 8/2015 | Frank et al. |
| 9,208,162 | B1 | 12/2015 | Hallak et al. |
| 9,286,003 | B1 | 3/2016 | Hallak et al. |
| 9,606,870 | B1 | 3/2017 | Meiri et al. |
| 9,716,754 | B2 | 7/2017 | Swift |
| 2008/0279462 | A1 | 11/2008 | Celi, Jr. |
| 2009/0132955 | A1 | 5/2009 | Garg et al. |
| 2010/0179941 | A1 | 7/2010 | Agrawal et al. |
| 2013/0325824 | A1 | 12/2013 | Shoens |
| 2014/0074782 | A1* | 3/2014 | Green .................. G06F 3/061 707/620 |
| 2014/0181016 | A1 | 6/2014 | Whitehead et al. |
| 2014/0310473 | A1* | 10/2014 | Bilas .................. G06F 11/00 711/129 |
| 2016/0150012 | A1 | 5/2016 | Barszczak et al. |
| 2016/0170987 | A1 | 6/2016 | Kesselman |
| 2016/0202927 | A1 | 7/2016 | Klarakis et al. |
| 2016/0224259 | A1 | 8/2016 | Ahrens et al. |
| 2016/0350358 | A1* | 12/2016 | Patel .................. G06F 16/1748 |
| 2017/0192857 | A1 | 7/2017 | Meiri et al. |

OTHER PUBLICATIONS

EMC Corporation, "Introduction to the EMC XtremIO Storage Array (Ver. 4.0): A Detailed Review," White Paper, Apr. 2015, 65 pages.

EMC Corporation, "Unstoppable Data Reduction: Always-on, In-Line, Zero-Penalty, Enterprise-Class, Free,"https://store.emc.com/xtremio, Jul. 2014, 2 pages.

EMC Corporation, "Introduction to XtremIO Virtual Copies," White Paper, Mar. 2016, 39 pages.

EMC Corporation, "XtremIO Data Production (XDP): Flash-Specific Data Protection, Provided by XtremIO (Ver. 4.0)," White Paper, Apr. 2015, 25 pages.

Dell EMC, "XtremIO v6.0 Specifications," Specification Sheet, 2017, 4 pages.

Dell EMC, "Dell EMC XtremzIO X2: Next-Generation All-Flash Array," Data Sheet, 2017, 5 page.

EMC Corporation, "High Availability, Data Protection and Data Integrity in the XtremIO Architecture," White Paper, Apr. 2015, 28 pages.

Y. Zhang et al., "End-to-End Integrity for File Systems: A ZFS Case Study," Proceedings of the 8th USENIX Conference on File and Storage Technologies (FAST), Feb. 23-26, 2010, 14 pages.

Dell EMC, "Introduction to Dell EMC XtremIO X2 Storage Array—A Detailed Review," Dell EMC White Paper, Aug. 2017, 46 pages.

N. Tolia et al., "Opportunistic Use of Content Addressable Storage for Distributed File Systems," Proceedings of the USENIX Annual Technical Conference, Jun. 9-14, 2003, 14 pages.

EMC Corporation, "EMC Recoverpoint Replication of XtremIO: Understanding the Essentials of RecoverPoint SNAP-Based Replication for XtremIO," EMC White Paper, Aug. 2015, 31 pages.

Dell EMC, "Introduction to Dell EMC XtremIO X2 Storage Array—A Detailed Review," Dell EMC White Paper, Apr. 2018, 52 pages.

Dell Emc, "Introduction to XtremIO Metadata—Aware Replication," Dell EMC White Paper, Apr. 2018, 18 pages.

U.S. Appl. No. 15/884,577, filed in the name of Zvi Schneider et al. on Jan. 31, 2018 and entitled "Storage System with Decoupling and Reordering of Logical and Physical Capacity Removal."

* cited by examiner

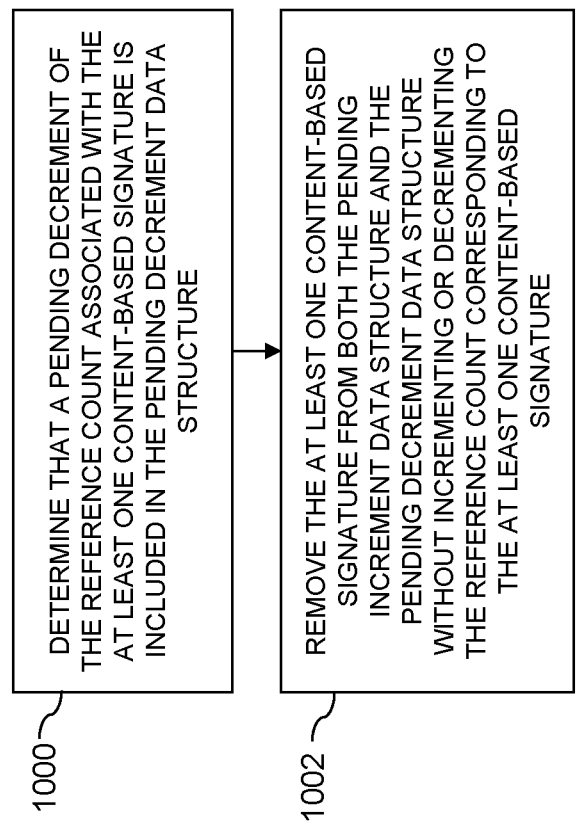

STORAGE SYSTEM WITH DECOUPLING OF REFERENCE COUNT UPDATES

FIELD

The field relates generally to information processing systems, and more particularly to storage in information processing systems.

BACKGROUND

In some content addressable storage systems, the number of references to a physical block of data stored in a persistent data storage location may change as a result of input-output (IO) processing. For example, if the number of logical blocks that point to the same physical block increases, a reference count associated with that physical block may be incremented. Likewise, if the number of logical blocks that point to the same physical block decreases, the reference count associated with that physical block may be decremented. When all logical block references to a given physical block are removed, the reference count for that physical block becomes zero and its capacity can be released.

SUMMARY

In one embodiment, an apparatus comprises a storage system comprising a plurality of storage devices and an associated storage controller. The storage devices are configured to store user data pages and metadata pages. Each of the user data pages has a logical address and a content-based signature derived from content of that data page. Each of the metadata pages characterizes a plurality of the user data pages and associates the content-based signatures of those user data pages with respective physical blocks in the storage devices. The storage controller is configured to receive a request to copy a first range of logical addresses to a second range of logical addresses and determine at least one content-based signature corresponding to at least one physical block of the storage devices to which the first range of logical addresses is mapped. The storage controller is further configured to map the second range of logical addresses to the determined at least one content-based signature and add the determined at least one content-based signature to a pending increment data structure associated with the storage controller. The pending increment data structure includes content-based signatures corresponding to physical blocks for which an increment of an associated reference count is pending. The storage controller is further configured to execute a pending increment of a reference count associated with a given content-based signature in the pending increment data structure. The storage controller may be implemented using at least one processing device comprising a processor coupled to a memory.

In some embodiments, a pending decrement data structure associated with the storage controller may include the given content-based signature, the given content-based signature in the pending decrement data structure corresponding to a physical block for which a decrement of the associated reference count is pending.

In some embodiments, the pending increment data structure and the pending decrement data structure may be the same data structure.

The pending increment data structure may also include a timestamp. The timestamp of the pending increment data structure represents a time at which a content-based signature corresponding to a physical block for which an increment of an associated reference count is pending was added to the pending increment data structure.

The pending decrement data structure associated with the storage controller may include a timestamp that represents a time at which a content-based signature corresponding to a physical block for which a decrement of an associated reference count is pending was added to the pending decrement data structure.

The storage controller may be configured to execute the pending increment of the reference count associated with the given content-based signature before executing a pending decrement of the reference count associated with the given content-based signature based on a comparison of the timestamp of the pending increment data structure to the timestamp of the pending decrement data structure.

In some embodiments, executing the pending increment of the reference count associated with the given content-based signature in the pending increment data structure may comprise determining that a pending decrement of the reference count associated with the given content-based signature is included in the pending decrement data structure and removing the given content-based signature from both the pending increment data structure and the pending decrement data structure without incrementing or decrementing the reference count associated with the given content-based signature.

These and other illustrative embodiments include, without limitation, apparatus, systems, methods and processor-readable storage media.

BRIEF DESCRIPTION OF THE DRAWINGS

FIG. 10 is a flow diagram of an example process for executing a pending increment in an illustrative embodiment.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous other types of enterprise computing and storage systems are also encompassed by the term "information processing system" as that term is broadly used herein.

Figure 1:
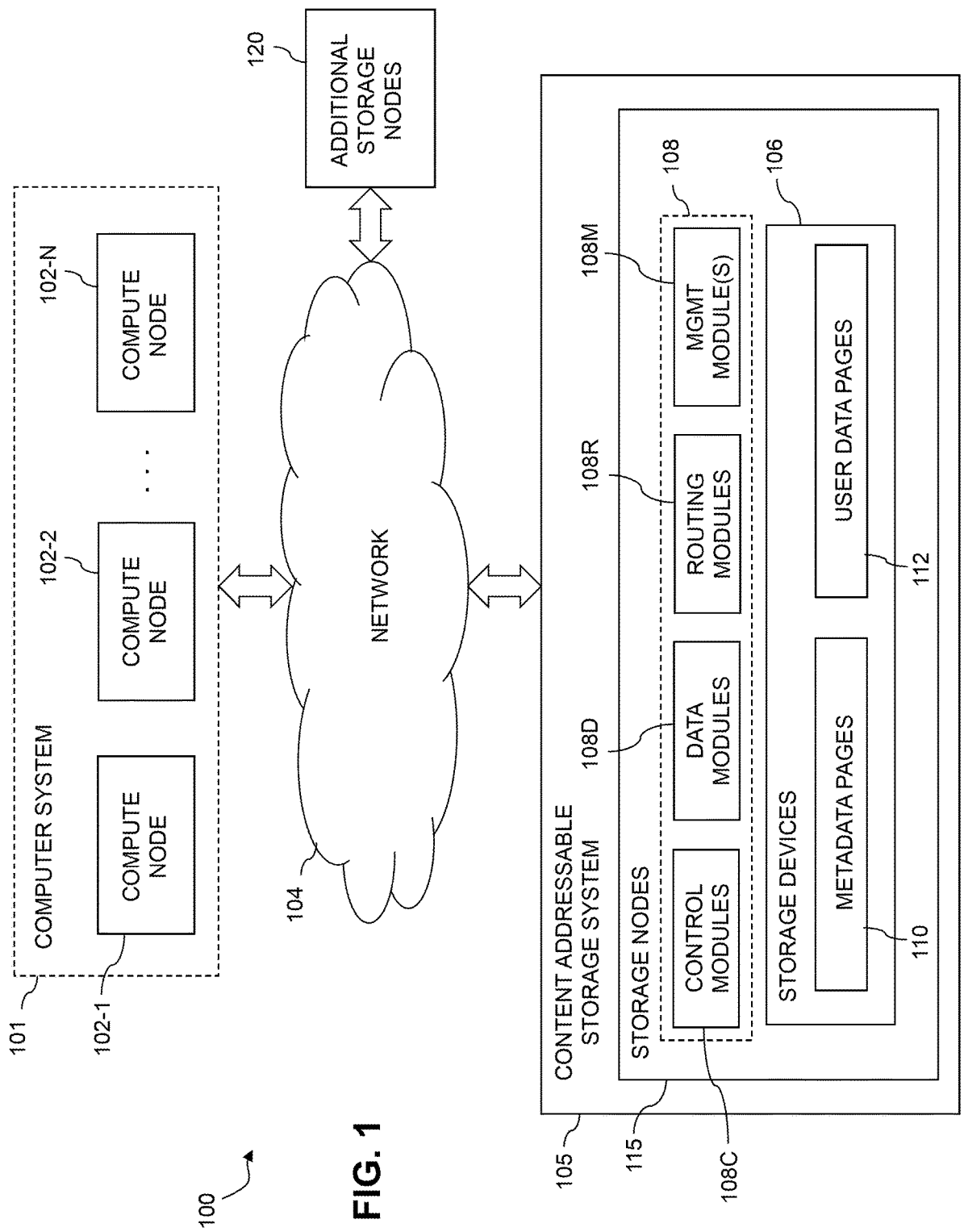
FIG. 1 is a block diagram of an information processing system comprising a content addressable storage system configured with functionality for decoupling reference count updates in an illustrative embodiment.

FIG. 1 shows an information processing system 100 configured in accordance with an illustrative embodiment. The information processing system 100 comprises a computer system 101 that includes compute nodes 102-1, 102-2, . . . 102-N. The compute nodes 102 communicate over a network 104 with a content addressable storage system 105. The computer system 101 is assumed to comprise an enterprise computer system or other arrangement of multiple compute nodes associated with respective users.

The compute nodes 102 illustratively comprise respective processing devices of one or more processing platforms. For example, the compute nodes 102 can comprise respective virtual machines (VMs) each having a processor and a memory, although numerous other configurations are possible.

The compute nodes 102 can additionally or alternatively be part of cloud infrastructure such as an Amazon Web Services (AWS) system. Other examples of cloud-based systems that can be used to provide compute nodes 102 and possibly other portions of system 100 include Google Cloud Platform (GCP) and Microsoft Azure.

The compute nodes 102 may be viewed as examples of what are more generally referred to herein as "host devices" or simply "hosts." Such host devices are configured to write data to and read data from the content addressable storage system 105. The compute nodes 102 and the content addressable storage system 105 may be implemented on a common processing platform, or on separate processing platforms. A wide variety of other types of host devices can be used in other embodiments.

The compute nodes 102 in some embodiments illustratively provide compute services such as execution of one or more applications on behalf of each of one or more users associated with respective ones of the compute nodes 102.

The term "user" herein is intended to be broadly construed so as to encompass numerous arrangements of human, hardware, software or firmware entities, as well as combinations of such entities. Compute and/or storage services may be provided for users under a platform-as-a-service (PaaS) model, although it is to be appreciated that numerous other cloud infrastructure arrangements could be used. Also, illustrative embodiments can be implemented outside of the cloud infrastructure context, as in the case of a stand-alone enterprise-based computing and storage system.

Such users of the storage system 105 in some cases are referred to herein as respective "clients" of the storage system 105.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The content addressable storage system 105 is accessible to the compute nodes 102 of the computer system 101 over the network 104. The content addressable storage system 105 comprises a plurality of storage devices 106 and an associated storage controller 108. The storage devices 106 are configured to store metadata pages 110 and user data pages 112 and may also store additional information not explicitly shown such as checkpoints and write journals. The metadata pages 110 and the user data pages 112 are illustratively stored in respective designated metadata and user data areas of the storage devices 106. Accordingly, metadata pages 110 and user data pages 112 may be viewed as corresponding to respective designated metadata and user data areas of the storage devices 106.

A given "page" as the term is broadly used herein should not be viewed as being limited to any particular range of fixed sizes. In some embodiments, a page size of 8 kilobytes (KB) is used, but this is by way of example only and can be varied in other embodiments. For example, page sizes of 4 KB or other values can be used. Accordingly, illustrative embodiments can utilize any of a wide variety of alternative paging arrangements for organizing the metadata pages 110 and the user data pages 112.

The user data pages 112 are part of a plurality of logical units (LUNs) configured to store files, blocks, objects or other arrangements of data, each also generally referred to herein as a "data item," on behalf of users associated with compute nodes 102. Each such LUN may comprise particular ones of the above-noted pages of the user data area. The user data stored in the user data pages 112 can include any type of user data that may be utilized in the system 100. The term "user data" herein is therefore also intended to be broadly construed.

It is assumed in the present embodiment that the storage devices 106 comprise solid state drives (SSDs). Such SSDs are implemented using non-volatile memory (NVM) devices such as flash memory. Other types of NVM devices that can be used to implement at least a portion of the storage devices 106 include non-volatile random-access memory (NVRAM), phase-change RAM (PC-RAM) and magnetic RAM (MRAM). Various combinations of multiple different types of NVM devices may also be used.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, flash drives, solid state drives, hard disk drives, hybrid drives or other types of storage devices.

In some embodiments, the content addressable storage system 105 illustratively comprises a scale-out all-flash storage array such as an XtremIO™ storage array from Dell EMC of Hopkinton, Mass. Other types of storage arrays, including by way of example VNX® and Symmetrix VMAX® storage arrays also from Dell EMC, can be used to implement storage systems in other embodiments.

The term "storage system" as used herein is therefore intended to be broadly construed and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing a given storage system in an illustrative embodiment include all-flash and hybrid flash storage arrays such as Unity™, software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

The content addressable storage system 105 in the embodiment of FIG. 1 is configured to generate hash metadata providing a mapping between content-based digests of respective ones of the user data pages 112 and corresponding physical locations of those pages in the user data area. Such content-based digests are examples of what are more generally referred to herein as "content-based signatures" of the respective user data pages 112. The hash metadata generated by the content addressable storage system 105 is illustratively stored as metadata pages 110 in the metadata area.

The generation and storage of the hash metadata is assumed to be performed under the control of the storage controller 108. The hash metadata may be stored in the metadata area in a plurality of entries corresponding to respective buckets each comprising multiple cache lines, although other arrangements can be used.

Figure 2:
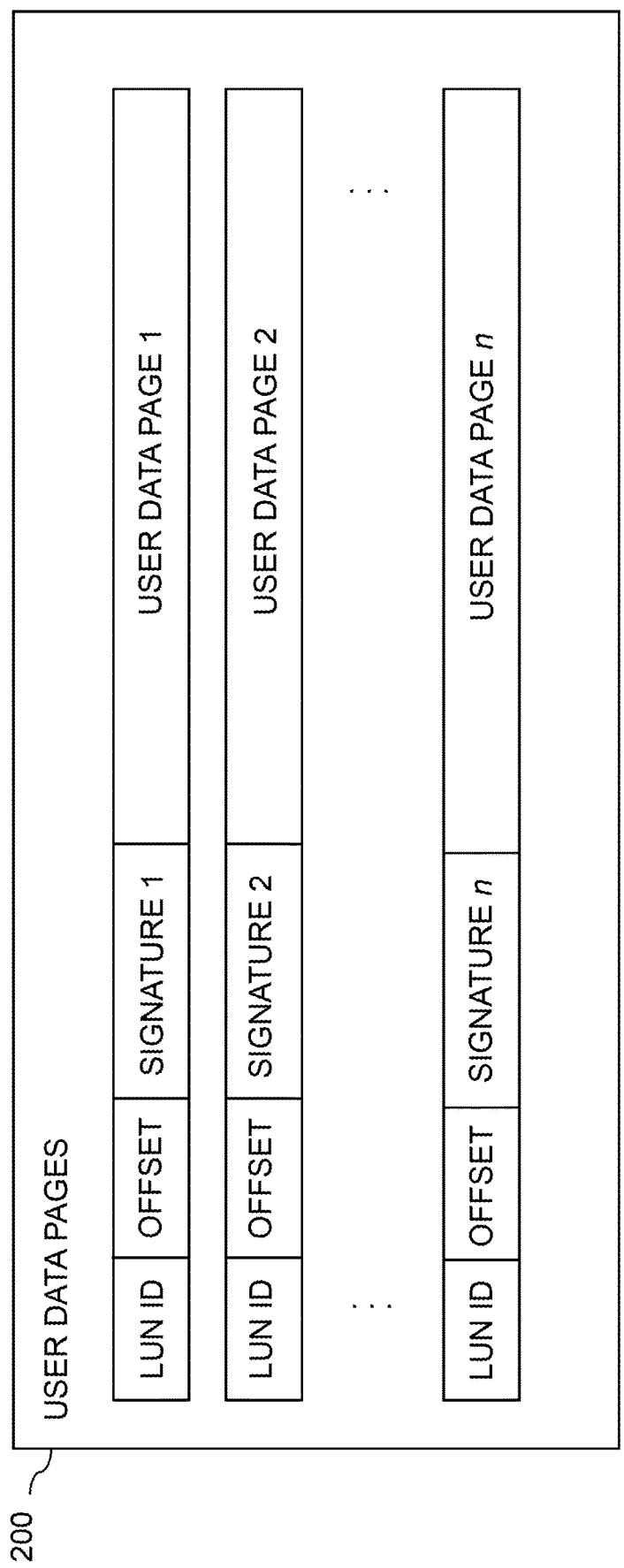
FIG. 2 shows an example of a set of user data pages in an illustrative embodiment.

Each of the metadata pages 110 characterizes a plurality of the user data pages 112. For example, as illustrated in FIG. 2, a given set of user data pages 200 representing a portion of the user data pages 112 illustratively comprises a plurality of user data pages denoted User Data Page 1, User Data Page 2, . . . User Data Page n. Each of the user data pages in this example is characterized by a LUN identifier, an offset and a content-based signature. The content-based signature is generated as a hash function of content of the corresponding user data page. Illustrative hash functions that may be used to generate the content-based signature include SHA1, where SHA denotes Secure Hashing Algorithm, or other SHA protocols known to those skilled in the art. The content-based signature is utilized to determine the location of the corresponding user data page within the user data area of the storage devices 106 of the content addressable storage system 105.

Each of the metadata pages 110 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

Figure 3:
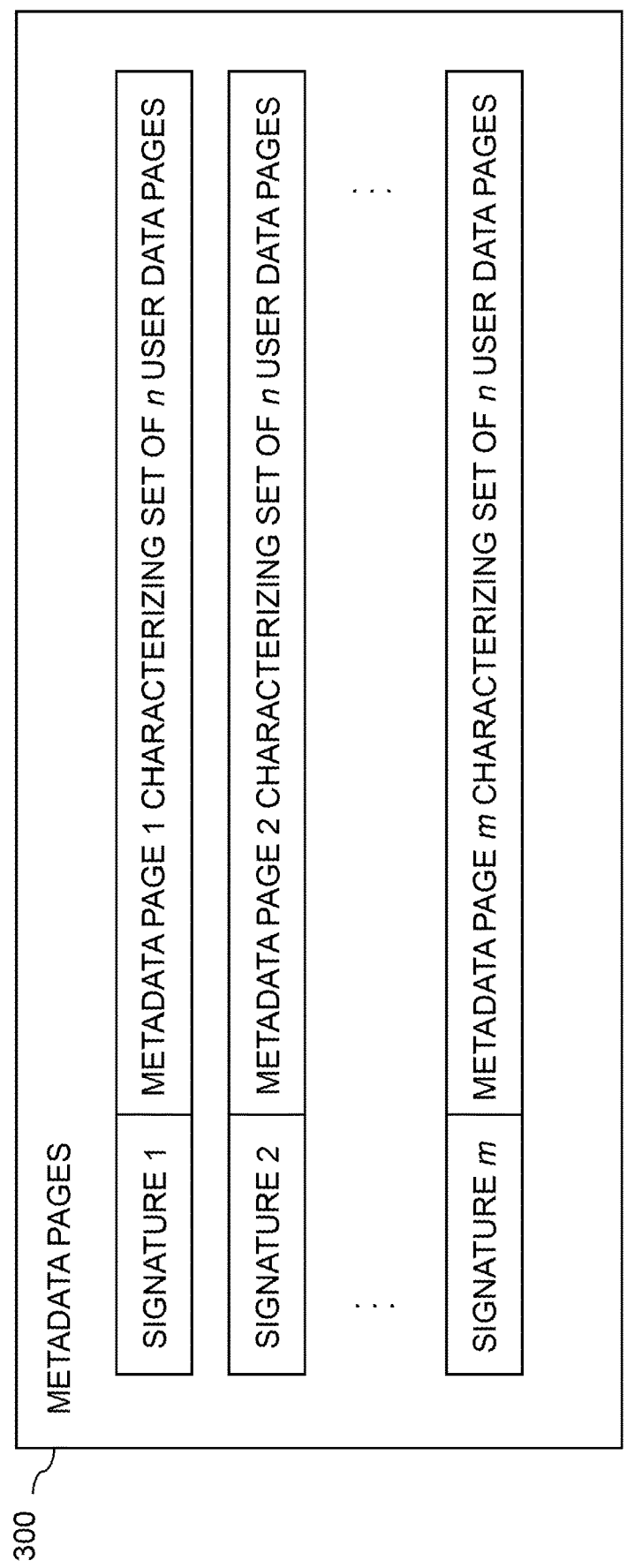
FIG. 3 shows an example of a set of metadata pages in an illustrative embodiment.

This is illustrated in FIG. 3, which shows a given set of metadata pages 300 representing a portion of the metadata pages 110 in an illustrative embodiment. The metadata pages in this example include metadata pages denoted Metadata Page 1, Metadata Page 2, . . . Metadata Page m, having respective signatures denoted Signature 1, Signature 2, . . . Signature m. Each such metadata page characterizes a different set of n user data pages. For example, the characterizing information in each metadata page can include the LUN identifiers, offsets and content-based signatures for each of the n user data pages that are characterized by that metadata page. It is to be appreciated, however, that the user data and metadata page configurations shown in FIGS. 2 and 3 are examples only, and numerous alternative user data and metadata page configurations can be used in other embodiments.

The content addressable storage system 105 in the FIG. 1 embodiment is implemented as at least a portion of a clustered storage system and includes a plurality of storage nodes 115 each comprising a corresponding subset of the storage devices 106. Other clustered storage system arrangements comprising multiple storage nodes can be used in other embodiments. A given clustered storage system may include not only storage nodes 115 but also additional storage nodes 120 coupled to network 104. Alternatively, the additional storage nodes 120 may be part of another clustered storage system of the system 100. Each of the storage nodes 115 and 120 of the system 100 is assumed to be implemented using at least one processing device comprising a processor coupled to a memory.

The storage controller 108 of the content addressable storage system 105 is implemented in a distributed manner so as to comprise a plurality of distributed storage controller components implemented on respective ones of the storage nodes 115 of the content addressable storage system 105. The storage controller 108 is therefore an example of what is more generally referred to herein as a "distributed storage controller." In subsequent description herein, the storage controller 108 may be more particularly referred to as a distributed storage controller. Each of the storage nodes 115 in this embodiment further comprises a set of processing modules configured to communicate over one or more networks with corresponding sets of processing modules on other ones of the storage nodes 115. The sets of processing modules of the storage nodes 115 collectively comprise at least a portion of the distributed storage controller 108 of the content addressable storage system 105.

The distributed storage controller 108 in the present embodiment is configured to implement functionality for reference count update logic in the content addressable storage system 105.

As noted above, the storage devices 106 are configured to store user data pages 200 and metadata pages 300 in respective user data page and metadata page areas. Each of the user data pages 200 comprises a logical address and a content-based signature derived from content of that data page, and each of the metadata pages 300 characterizes a plurality of the user data pages 200 and associates the content-based signatures of those user data pages with respective physical blocks in the storage devices 106.

The modules of the distributed storage controller 108 in the present embodiment more particularly comprise different sets of processing modules implemented on each of the storage nodes 115. The set of processing modules of each of the storage nodes 115 comprises at least a control module 108C, a data module 108D and a routing module 108R. The distributed storage controller 108 further comprises one or more management ("MGMT") modules 108M. For example, only a single one of the storage nodes 115 may include a management module 108M. It is also possible that management modules 108M may be implemented on each of at least a subset of the storage nodes 115.

Communication links may be established between the various processing modules of the distributed storage controller 108 using well-known communication protocols such as Transmission Control Protocol (TCP) and Internet Protocol (IP). For example, respective sets of IP links used in data transfer and corresponding messaging could be associated with respective different ones of the routing modules 108R.

Ownership of a user data logical address space within the content addressable storage system 105 is illustratively distributed among the control modules 108C. In some embodiments, the management module 108M may include a reference count update engine or other arrangement of reference count update logic that engages corresponding reference count update logic instances in all of the control modules 108C and routing modules 108R in order to implement reference count update process within the system 100, an example of which can be found in U.S. patent application Ser. No. 15/884,577, entitled "Storage System With Decoupling And Reordering Of Logical And Physical Capacity Removal," now issued as U.S. Pat. No. 10,261,693 on Apr. 16, 2019 which is incorporated by reference herein in its entirety.

In some embodiments, the management module 108M may include a reference count engine or other arrangement of reference count control logic that engages corresponding reference count control logic instances in all of the control modules 108C and routing modules 108R in order to implement a reference count update process within the system 100, for example, as will be described in more detail below in conjunction with FIG. 4. It is desirable in these and other storage system contexts to implement functionality for reference count update logic across multiple distributed processing modules, such as the processing modules 108C, 108D, 108R and 108M of the distributed storage controller 108.

In some embodiments, the content addressable storage system 105 comprises an XtremI™ storage array suitably modified to incorporate reference count update techniques as disclosed herein. In arrangements of this type, the control modules 108C, data modules 108D and routing modules 108R of the distributed storage controller 108 illustratively comprise respective C-modules, D-modules and R-modules of the XtremIO™ storage array. The one or more management modules 108M of the distributed storage controller 108 in such arrangements illustratively comprise a system-wide management module ("SYM module") of the XtremIO™ storage array, although other types and arrangements of system-wide management modules can be used in other embodiments. Accordingly, functionality for reference count update logic in some embodiments is implemented under the control of at least one system-wide management module of the distributed storage controller 108, utilizing the C-modules, D-modules and R-modules of the XtremIO™ storage array.

In the above-described XtremIO™ storage array example, each user data page typically has a size of 8 KB and its content-based signature is a 20-byte signature generated using an SHA1 hash function. Also, each page has a LUN identifier and an offset, and so is characterized by <lun_id, offset, signature>.

The content-based signature in the present example is also referred to as a "hash handle" of the corresponding data page, as the content-based signature is generated by applying a hash function such as SHA1 to the content of that data page.

As mentioned previously, storage controller components in an XtremIO™ storage array illustratively include C-module, D-module and R-module components. For example, separate instances of such components can be associated with each of a plurality of storage nodes in a clustered storage system implementation.

The distributed storage controller in this example is configured to group consecutive pages into page groups, to arrange the page groups into slices, and to assign the slices to different ones of the C-modules.

The D-module allows a user to locate a given user data page based on its signature. Each metadata page also has a size of 8 KB and includes multiple instances of the <lun_id, offset, signature> for respective ones of a plurality of the user data pages. Such metadata pages are illustratively generated by the C-module but are accessed using the D-module based on a metadata page signature.

The metadata page signature in this embodiment is a 20-byte signature but is not based on the content of the metadata page. Instead, the metadata page signature is generated based on an 8-byte metadata page identifier that is a function of the LUN identifier and offset information of that metadata page.

If a user wants to read a user data page having a particular LUN identifier and offset, the corresponding metadata page identifier is first determined, then the metadata page signature is computed for the identified metadata page, and then the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the D-module. This metadata page will include the <lun_id, offset, signature> for the user data page if the user page exists. The signature of the user data page is then used to retrieve that user data page, also via the D-module.

Additional examples of content addressable storage functionality implemented in some embodiments by control modules 108C, data modules 108D, routing modules 108R and management module(s) 108M of distributed storage controller 108 can be found in U.S. Pat. No. 9,104,326, entitled "Scalable Block Data Storage Using Content Addressing," which is incorporated by reference herein. Alternative arrangements of these and other storage node processing modules of a distributed storage controller in a content addressable storage system can be used in other embodiments.

Each of the storage nodes 115 of the storage system 105 comprises a set of processing modules configured to communicate over one or more networks with corresponding sets of processing modules on other ones of the storage nodes. A given such set of processing modules implemented on a particular storage node illustratively includes at least one control module 108C, at least one data module 108D and at least one routing module 108R, and possibly a management module 108M. These sets of processing modules of the storage nodes collectively comprise at least a portion of the distributed storage controller 108.

The term "write request" as used herein is intended to be broadly construed, so as to encompass one or more IO operations directing that at least one data item of a storage system be written to in a particular manner. A given write request is illustratively received in a storage system from a host device. For example, in some embodiments, a write request is received in a distributed storage controller of the storage system and directed from one processing module to another processing module of the distributed storage controller. More particularly, in the embodiment to be described below in conjunction with FIG. 4, a received write request is directed from a routing module of the distributed storage controller to a particular control module of the distributed storage controller. Other arrangements for receiving and processing write requests from one or more host devices can be used.

Figure 4:
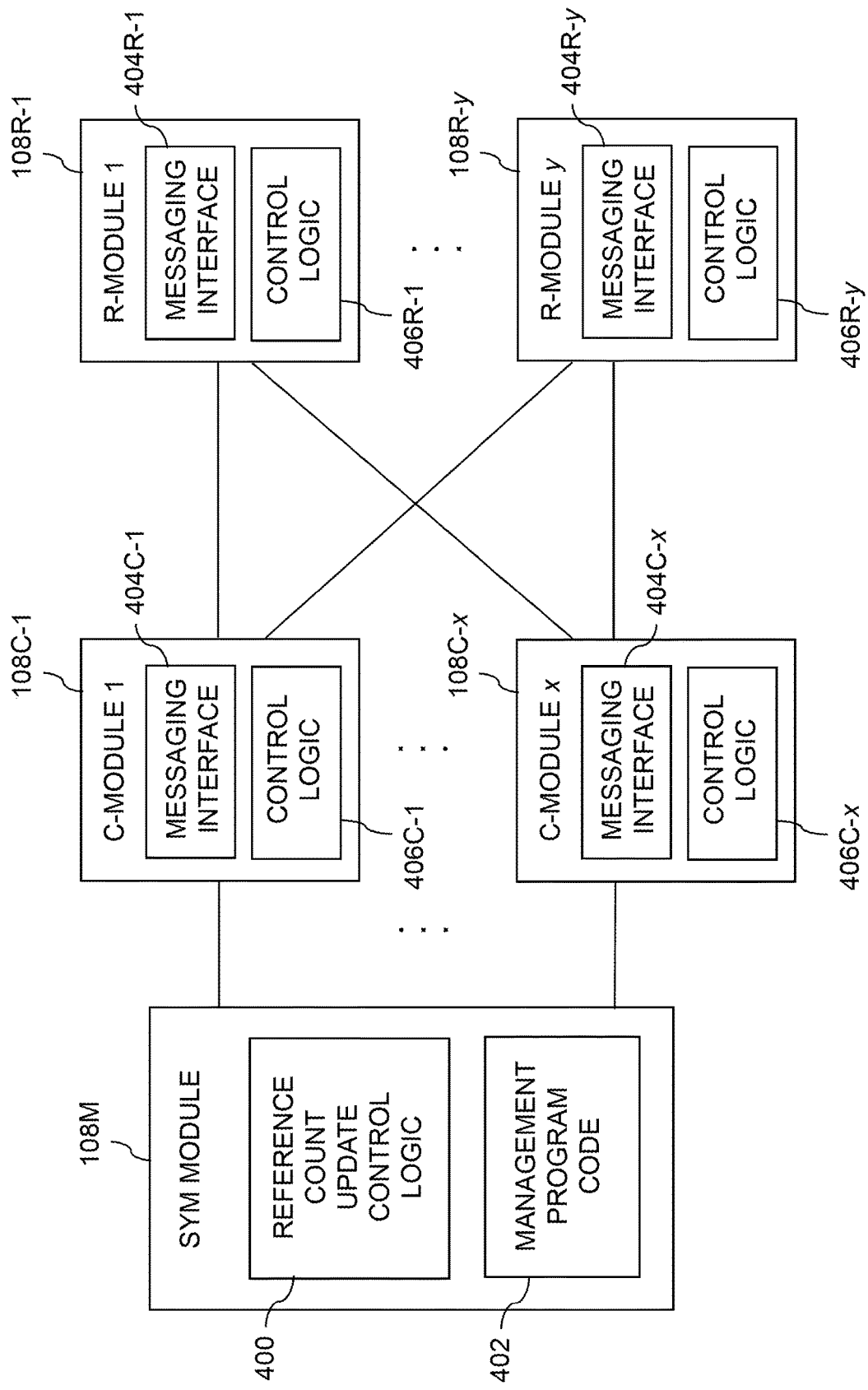
FIG. 4 illustrates a portion of a distributed storage controller of a content addressable storage system showing one possible arrangement supporting the decoupling of reference count updates.

Referring now to FIG. 4, a more detailed view of a portion of the distributed storage controller 108 in an illustrative embodiment is shown. This embodiment illustrates an example of communications between control modules 108C and routing modules 108R of the distributed storage controller 108.

The management module 108M of the distributed storage controller 108 in this embodiment more particularly comprises a system-wide management module or SYM module of the type mentioned previously. Although only a single SYM module is shown in this embodiment, other embodiments can include multiple instances of the SYM module possibly implemented on different ones of the storage nodes. It is therefore assumed that the distributed storage controller 108 comprises one or more management modules 108M.

A given instance of management module 108M comprises reference count update control logic 400 and associated management program code 402. The management module 108M communicates with control modules 108C-1 through 108C-x, also denoted as C-module 1 through C-module x. The control modules 108C communicate with routing modules 108R-1 through 108R-y, also denoted as R-module 1 through R-module y. The variables x and y are arbitrary integers greater than one and may but need not be equal. In some embodiments, each of the storage nodes 115 of the content addressable storage system 105 comprises one of the control modules 108C and one of the routing modules 108R, as well as one or more additional modules including one of the data modules 108D.

The control modules 108C-1 through 108C-x in the FIG. 4 embodiment comprise respective messaging interfaces 404C-1 through 404C-x. These messaging interfaces 404C are utilized by corresponding instances of control logic 406C-1 through 406C-x to generate, receive and otherwise process messages in conjunction with a reference count update process.

For example, the messaging interfaces 404C are utilized to generate control-to-routing messages for transmission to the routing modules 108R, and to process routing-to-control messages received from the routing modules 108R. The messaging interfaces 404C also generate messages for transmission to the management module 108M and process instructions and other messages received from the management module 108M in conjunction with performing functions associated with implementation of the reference count update process.

The routing modules 108R-1 through 108R-y in the FIG. 4 embodiment comprise respective messaging interfaces 404R-1 through 404R-y. These messaging interfaces 404R are utilized by corresponding instances of control logic 406R-1 through 406R-y to generate routing-to-control messages for transmission to one or more of the control modules 108C and to process control-to-routing messages received from one or more of the control modules 108C in conjunction with performing functions associated with implementation of the reference count update process.

The manner in which reference counts are updated is provided in the FIG. 4 embodiment which will now be described. The process is assumed to be carried out by the processing modules 108C, 108D, 108R and 108M. It is further assumed that the control modules 108C write data pages in the content addressable storage system 105 via the data modules 108D in accordance with write requests received from host devices via the routing modules 108R. The host devices illustratively comprise respective ones of the compute nodes 102 of the computer system 101.

The write requests from the host devices identify particular data pages to be written in the storage system 105 by their corresponding logical addresses each comprising a LUN ID and an offset.

As noted above, a given one of the content-based signatures comprises a hash handle of the corresponding data page, with the hash handle being generated by applying a hash function to the content of that data page.

The storage system 105 utilizes a two-level mapping process to map logical block addresses to physical block addresses. The first level of mapping uses an address-to-hash ("A2H") table and the second level of mapping uses a hash metadata ("HMD") table, with the A2H and HMD tables corresponding to respective logical and physical layers of the content-based signature mapping within the storage system 105.

The first level of mapping using the A2H table associates logical addresses of respective data pages with respective content-based signatures of those data pages. This is also referred to as logical layer mapping.

The second level of mapping using the HMD table associates respective ones of the content-based signatures with respective physical storage locations in one or more of the storage devices 106. This is also referred to as physical layer mapping.

For a given write request, both of the corresponding HMD and A2H tables are updated in conjunction with the processing of that write request.

The A2H and HMD tables described above are examples of what are more generally referred to herein as "mapping tables" of respective first and second distinct types. Other types and arrangements of mapping tables or other content-based signature mapping information may be used in other embodiments.

Execution of a given write request received in the storage system 105 from a host device illustratively involves the following operations:

1. Receive the write request in a particular control module 108C from a particular routing module 108R.

2. Acquire an IO process component (CIO) address range lock for the logical address range to be written, where CIO refers to an IO process component in the control module 108C. As noted above, the control modules have ownership of particular logical address spaces, and the CIO address therefore denotes a global logical address for a given storage block.

3. Perform a read-modify operation if the write is a small or unaligned write. Examples of read-modify operations for use with small or unaligned writes can be found in the above-cited U.S. Pat. No. 9,104,326.

4. Write the data pages to a data module 108D, based on a hash-to-data ("H2D") table. New hash handles are generated for the respective data pages, and reference counts associated with the new hash handles are incremented. The incrementing of reference counts is an example of what is more generally referred to as a "referencing operation" or "incref" operation.

5. Release the CIO address range lock.

6. Send a response back to the requesting routing module 108R.

7. Decrement reference counts associated with the old hash handles of respective data pages that have been overwritten. The decrementing of reference counts is an example of what is more generally referred to herein as a "dereferencing operation" or "decref" operation.

The reference counts mentioned above are illustratively maintained for respective physical blocks in the storage devices 106 and each such reference count indicates for its corresponding physical block the number of logical blocks that point to that same physical block, e.g., the number of logical blocks mapped to the content-based signature corresponding to that physical block. When all logical block references to a given physical block are removed, the reference count for that physical block becomes zero and its capacity can be released.

If the same data D is written to two logical addresses A and B in the storage system by a host device, the content-based signature, e.g., hash signature or hash handle, corresponding to the data D will have an associated reference count of two. When address A is deleted or overwritten, the reference count corresponding to data D is decremented from two to one. If logical address B is later trimmed or overwritten, the reference count associated with the content-based signature corresponding to data D will be decremented to zero, the content-based signature will be deleted, and the data space on the physical disk will be freed up for use by new data writes.

A given "referencing operation" as that term is broadly used herein is intended to encompass incrementing of a reference count associated with a physical block. A given "dereferencing operation" as that term is broadly used herein is intended to encompass decrementing of a reference count associated with a physical block.

The operation of decrementing the reference count typically requires a metadata update, and therefore impacts system resources when large scale deletions are performed. As mentioned above, U.S. patent application Ser. No. 15/884,577, describes a mechanism to address this issue. This mechanism provides an efficient method to temporarily store the content-based signatures associated with pending decrement operations prior to execution. This temporary storage may be persistent such that, for example, the content-based signatures will not be lost due to a power event or other failure.

When a large number of content-based signatures associated with pending decrement operations have been stored, the decrement of the corresponding reference counts may be performed in a gradual and efficient manner by grouping the decrement operations together, e.g., based on their respective content-based signatures, such that a single update operation may be performed on the reference counts associated with several content-based signatures at a time. For example, the decrement operations may be grouped based on a relative proximity of the physical blocks corresponding to the content-based signatures in the storage devices. This is unlike the typical flow where the update is performed synchronously for each content-based signature that required a decrement operation.

The logical address space illustratively comprises one or more ranges of logical block addresses (LBAs) each comprising a LUN ID and an offset. For example, each LBA can identify a particular one of the user data pages 200. The LBAs each correspond to one or more physical blocks in the storage devices 106. Other types of LBAs and logical address spaces can be used in other embodiments. The term "logical address" as used herein is therefore intended to be broadly construed.

In some embodiments, a given such logical address space may copied responsive to the receipt of a copy command such as, e.g., a command to copy a range of addresses to a new location (XCOPY), snapshots, cloning, or other similar functionality.

In a virtualized environment, for example, storage operations traditionally have been expensive from a resource perspective. Often, functions such as cloning and snapshots can be performed more efficiently by the storage device than by the host. Hardware acceleration or hardware offload application programming interfaces (APIs) may be utilized to enable communication between hosts and storage systems with the APIs defining a set of "storage primitives" that enable the hosts to offload certain storage operations to the storage system. By offloading these storage operations, resource overhead on the hosts may be reduced which may significantly improve performance for storage-intensive operations such as, e.g., storage cloning, zeroing, snapshots, copies, and other similar operations. In one example, a command may, for example, offload the operation of cloning data from a range of LBAs on a volume of the storage device to a range of LBAs on another volume on the same storage system.

In some cases, the goal of a hardware offload API is to take advantage of hardware assistance provided by a storage system to speed up IO operations of a host device that would be more efficiently accomplished in the storage hardware.

An example of a typical IO operation to make a copy of a range of LBAs will now be described. In response to receiving an IO request to perform a copy operation for a range of LBAs, the storage controller may determine which physical blocks correspond to the range of LBAs, e.g., using the A2H and HMD mappings, and may persist the copy for the corresponding physical blocks, e.g., by increasing the reference counts associated with the content-based signatures corresponding to the physical blocks. The storage controller may also map a new range of LBAs in the A2H mapping table to the same content-based signature as the original range of LBAs. The update to the reference counts is typically performed synchronously to the received request, as the update typically needs to be guaranteed before the host is acknowledged with confirmation of the copy. Since the new range of LBAs map to the content-based signatures corresponding to the same set of physical blocks, i.e., the data for the new range of LBAs is the same, no new user data need be stored to or modified in the system except for metadata associated with the reference count increase. In addition to updating the volatile metadata, the changes are also persisted in the persistent metadata layer. The copy operation does not require any data movement in the physical blocks and simply copies the content-based signatures in the A2H mapping table from the original LBA range to the new LBA range. The reference count of each physical block associated with the corresponding content-based signature is increased to represent the new additional logical reference to each physical data block.

In one example of an XCOPY operation, a range of LBAs A1, A2, A3, . . . , An may have corresponding content-based signatures H_d1, H_d2, H_d3, . . . , H_dn. In this example, the reference count for each of the content-based signatures may initially be 1, e.g., only this range of LBAs is mapped to these corresponding content-based signatures.

The XCOPY operation requests that the storage controller copy the content currently found in of LBAs A1-An to a new range of LBAs, B1, B2, B3, . . . , Bn. In response to the XCOPY operation, the storage controller sets the LBAs B1, B2, . . . , Bn to point to the corresponding content-based signatures H_d1, H_d2, . . . , H_dn, and changes the reference count associated with each of the content-based signatures to 2. The storage controller then acknowledges the host device that the operation has completed, i.e., that the data is consistent on B1-Bn, and can now be accessed by the host device.

While such a copy operation may be very fast in a content addressable storage system, it may also induce additional load on the resources of the storage system. For example, such a copy operation may create a metadata operation blast by requiring the reference counts associated with content-based signatures corresponding to a large number of physical blocks to be updated together at the same time or within a short period of time. For example, a copy operation requested on a large range of LBAs may require significant short-term usage of system resources to update the metadata including the reference counts associated with the content-based signatures for the corresponding physical blocks. All of these reference count updates must also be persisted to storage devices which requires significant processing resources and may limit the performance of the copy operation while also impacting the performance of regular IO operations due to the short-term increase in metadata operations during the blast.

In addition, in some systems, such copy operations do not typically occur continuously during normal workloads. For example, such copy operations may only represent a small portion of the normal workload of the storage system but may require significant system resource usage for a short period of time.

Given that such copy operations are not typically a significant part of the normal workload for the storage system, in some embodiments, it may be beneficial to spread out the increment operations for reference counts associated with the copy operations over a longer period of time or to delay some or all of the increment operations until a time of reduced resource load in the storage system. For example, since the increased resource load associated with metadata bursts of such copy operations will typically occur within a short period of time, in some embodiments, the increment operations may be delayed or spread out to alleviate the effect of the increased resource load on the storage system. This may allow the storage system to have a more consistent resource load level overall. However, an increment operation typically needs to be performed on a reference count before a logical block is mapped to the content-based signature for the corresponding physical address. This is because if the increment operation is delayed, there may be the possibility that the reference count is decremented to zero by a decrement operation before the increment operation is executed which may result in the data of the physical block being deleted.

In some embodiments, decrement operations may be aggregated by creating data structures, e.g., decrement pages, that contain content-based signatures associated with each physical block for which a reference count needs to be decremented, i.e., due to removal of a reference to the physical block in logical layer. The decrement operations may be delayed and gradually performed by the storage system in an optimal manner based on the decrement command pages, for example, by sorting the decrement operations into large groups and executing the decrement operations together according to physical metadata layout grouping. An example of a decoupling mechanism that executes such an aggregation and delay of decrement operations may be found in U.S. patent application Ser. No. 15/884,577, mentioned above.

Figure 5:
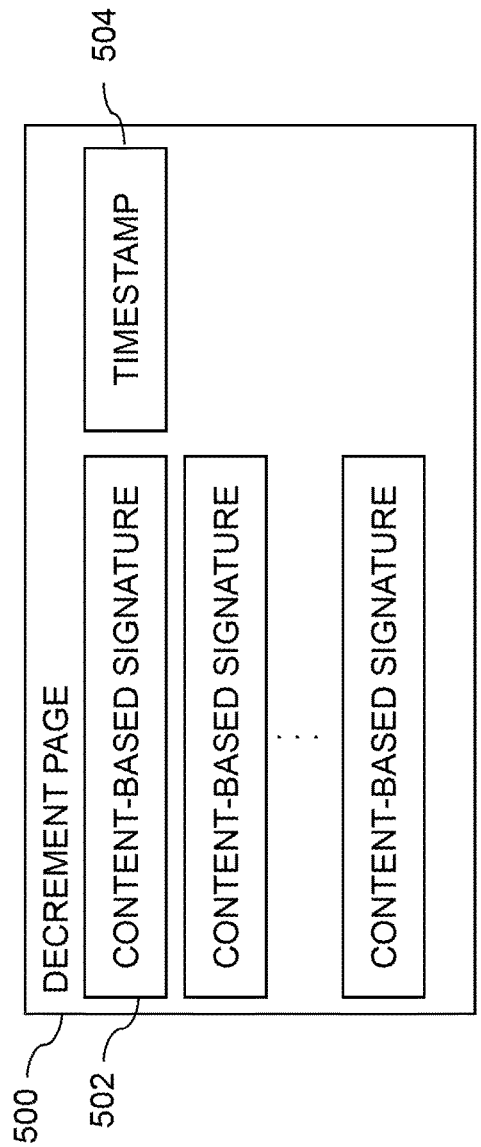
FIG. 5 shows an example of a pending decrement data structure in an illustrative embodiment.

With reference now to FIG. 5, in some embodiments, a given decrement page 500 may include content-based signatures 502 associated with requested decrement operations in a similar manner to that described above and in U.S. patent application Ser. No. 15/884,577. In addition, in some illustrative embodiments, the given decrement page 500 may be further extended to include a timestamp 504 representing the time at which the latest requested decrement operation was added to this page. In some embodiments, each content-based signature 502 may include an associated timestamp 504. While described as pages, the decrement pages 500 may comprise any other data structure.

Figure 6:
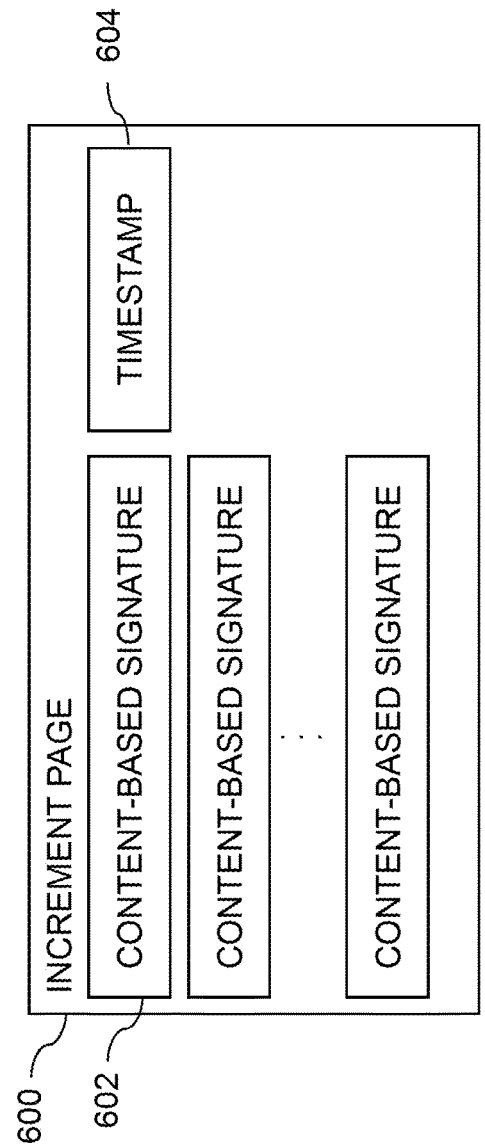
FIG. 6 shows an example of a pending increment data structure in an illustrative embodiment.

In illustrative embodiments, the copy command performance may also be improved, for example, by replacing the synchronous metadata update bursts associated with copy operations with asynchronous and optimized updates that may reduce the short-term resource load associated with synchronous metadata update bursts on the storage system 105. For example, as further illustrated in FIG. 6, new data structures, for example, increment pages 600, are disclosed that include content-based signatures 602 associated with physical blocks for which the reference counts will be incremented by increment operations. In some embodiments, for example, the increment pages 600 may operate in a similar manner to the decrement pages 500. In addition, a given increment page 600 may also include a timestamp 604 representing the time of the earliest requested increment operation for this page.

The use of increment pages 600 allows the storage system 105 to decouple incoming increment operations from synchronous copy operations. For example, instead of executing increment operations as part of the servicing of an IO request or copy request, the increment operations may be added to the increment pages 600 for later execution asynchronously at a time when the storage system 105 may be better able to handle the load.

Pending decrement and increment operations may be added to the decrement pages 500 and increment pages 600 in an extremely fast and efficient manner since the actual increment and decrement operations are not yet performed and the associated metadata processing and storage may be delayed.

In some embodiments, a pending decrement operation may be any decrement operation triggered by an LBA overwrite that was not executed yet and is included in a decrement page 500 for its execution by a thread of storage controller 108. A pending increment operation is any increment operation triggered by a copy command for a range of LBA addresses, which has not executed yet and is included in an increment page 600.

In some embodiments, the content-based signatures associated with pending increment operations and the content-based signatures associate with pending decrement operations may alternatively be stored in the same data structure, e.g., a combined increment/decrement page.

In an example copy operation, a range of LBAs may include LBAs A1, A2, A3, . . . , An, that may be mapped to corresponding content-based signatures H_d1, H_d2, H_d3, . . . H_dn, with the reference count for each of the content-based signatures being 1. When a copy operation is requested, the storage controller 108 may copy the content of LBAs A1-An to a new range of LBAs, B1, B2, B3, . . . , Bn. The storage controller 108 may set LBAs B1, B2, B3, . . . , Bn to point to the content-based signatures H_d1, H_d2, H_d3, . . . , H_dn in a similar manner to that described above. In this embodiment, the storage controller 108 adds the content-based signatures that require a reference count update, e.g., an increment operation, into the increment page 600. In some embodiments, the content-based signatures may be added into a combined increment/decrement page with a marking that these content-based signatures are for increment operations and not decrement operations. The storage controller then may acknowledge the host device that the copy operation has completed, i.e., that the data is consistent on LBAs B1-Bn, and can now be accessed by the host device. The storage controller 108 may later perform the aggregated reference count updates in an efficient way for the corresponding content-based signatures.

In some embodiments, when any pending increment operations are included in an increment page 600 that have timestamps earlier than all of the decrement operations included in a corresponding decrement page 500, the storage controller 108 may guarantee that the pending increment operations will be executed before any of the pending decrement operations found in the decrement page 500. For example, in some embodiments, the storage controller 108 may achieve this by ensuring that the execution of any decrement operations in the decrement pages 500 will first read/sort/execute all requests in the increment pages 600 for the same content-based signatures 502/602 that have a timestamp 604 that is less than the timestamp 504.

In some embodiments, for example, where the content-based signatures associated with increment and decrement operations are stored in the same increment/decrement page, the storage controller 108 may read and sort all of the content-based signatures, regardless of whether they are for an increment operation or a decrement operation. For example, in some embodiments, the content-based signatures may be sorted based on a time at which they were added to the increment/decrement page.

When later executing the increment or decrement operations on the references counts corresponding to the added content-based signature, the storage controller 108 may determine whether a particular group of content-based signatures requiring increment operations, decrement operations, or both, e.g., a grouping of content-based signatures for which the increment or decrement operations may be efficiently executed together, includes increment operations that should be executed before any decrement operations. For example, if the content-based signatures are grouped together, content-based signatures requiring increment operations that were added to the increment/decrement page prior to one or more of the content-based signatures requiring decrement operations may have their increment operations executed by the storage controller 108 before the execution of the decrement operations. In some embodiments the increment operations for the content-based signatures that were added at the earlier time may be executed before all of the decrement operations for the content-based signatures in the group, even if some of content-based signatures requiring decrement operations were added to the increment/decrement page prior to the content-based signatures requiring increment operations. In some embodiments, the grouping and execution described above may alternatively be performed using a separate increment 600 and decrement page 500.

In some embodiments, when sorting the content-based signatures requiring decrement and increment operations in the decrement and increment pages 500 and 600, opposite operations for the same content-based signature may also be eliminated. For example, if a given content-based signature included in a decrement page 500 requires a decrement operation and the given content-based signature is also included in the increment page 600 as requiring an increment operation, i.e., an increment operation that is opposite the decrement operation, the decrement and increment operations may be eliminated, e.g., removed, from the decrement page 500 and increment page 600 without execution of either of the increment or decrement operations. For example, the corresponding reference count may not be updated. In the embodiment where the increment and decrement pages 600 and 500 are combined as an increment/decrement page, if the same content-based signature is present in association with both an increment operation and a decrement operation, the content-based signature may be eliminated, e.g., removed from the increment/decrement page, with respect to those opposite operations. In this embodiment, other instances of the content-based signature, e.g., having additional increment operations or decrement operations, may remain in the increment/decrement page so long as no opposite operations for that content-based signature are present. This elimination of opposite operations may reduce the load on the storage system 105, for example, by avoiding the execution of unnecessary increment and decrement operations.

The above-described operations of the control modules 108C and routing modules 108R are carried out under the control of their respective control logic instances 406C and 406R in cooperation with the decoupled reference count control logic 400 and management program code 402 of the management module 108M. The control and routing modules of the distributed storage controller 108 therefore collectively implement portions of a decoupled reference count update process under the control of management module 108M as disclosed herein.

As a more particular example in the XtremIO™ context, a process for reference count update logic is advantageously configured to provide highly efficient updating of reference counts in the storage system. This is achieved in some embodiments by decoupling the copying of a range of logical addresses from the updating of the reference counts associated with the physical blocks in a manner that permits the reference count updates to be spread out or performed at a later time, thereby avoiding the inefficiencies associated with the use of metadata bursts to update reference counts as found in conventional tightly coupled arrangements. Storage system performance is therefore significantly improved.

The C-modules, D-modules and R-modules of the storage nodes in this context are assumed to be configured to communicate with one another over a high-speed internal network such as an InfiniBand (IB) network. The C-modules, D-modules and R-modules coordinate with one another to accomplish various IO processing tasks.

In this example, logical block addresses or LBAs of a logical layer of the storage system 105 correspond to respective physical blocks of a physical layer of the storage system 105. The user data pages of the logical layer are organized by LBA and have reference via respective content-based signatures to particular physical blocks of the physical layer.

Each of the physical blocks has an associated reference count that is maintained within the storage system. The reference count for a given physical block indicates the number of logical blocks that point to that same physical block.

When changes are made to the logical address space in the storage system, a dereferencing operation, e.g., decrement of a reference count, is generally executed for each of the LBAs being released and a referencing operation, e.g., increment of a reference count, is generally executed for each of the LBAs that is being copied. More particularly, the reference count of the content-based signature for the corresponding physical block is either decremented or incremented depending on the operation. A reference count of zero indicates that there are no longer any logical blocks that reference the content-based signature of the corresponding physical block, so that physical block can be released.

As mentioned previously, conventional arrangements can be problematic in that the updating of reference counts in response to a copy operation is typically tightly coupled with the copy operation itself. For example, a copy operation to copy a given source range of logical addresses to a target range of logical addresses and its corresponding increments of the reference counts associated with the content-based signatures for the corresponding physical blocks may occur substantially simultaneously by executing the increment operation to increment the reference counts in conjunction with the copy of the given range of logical addresses. However, this approach creates inefficiencies that can significantly undermine system performance. For example, a copy operation on a large range of logical addresses may require a burst of reference count updates for the reference counts associated with the content-based signatures for the corresponding physical blocks which may necessitate excessive consumption of system resources for updating of metadata pages for a short period of time and may result in a corresponding significant degradation in IO processing throughput.

Conventional systems with tight coupling of reference count updates to requested operations also fail to recognize that physical blocks are typically ordered in a substantially different manner than logical blocks within a storage system. Updating the reference counts associated with content-based signatures for corresponding physical blocks in the same order in which the corresponding logical blocks are copied may result in suboptimal processing within the storage system and may fail to adapt the updates to the reference counts to the particular manner in which the physical blocks are organized.

The functionality for updating reference counts in this particular example is advantageously configured to avoid these and other problems of conventional arrangements.

A range of logical addresses can be immediately copied for the client to use while the metadata update requirements, such as incrementing and decrementing the reference counts associated with the content-based signatures for the corresponding physical blocks, may be spread out or amortized in a highly efficient manner that is well-matched to the physical characteristics of the storage system so as to produce little or no impact on client IO processing performance.

The following description provides an additional illustration of advantages obtained in some embodiments using the above-described example process.

In one such embodiment, it is assumed that logical metadata is ordered similarly to the LUN layout and therefore its orderly copying and deletion is very effective. For example, for a given LUN, the logical metadata of logical addresses X and X+1 would be very close, probably in the same metadata physical page, so it is likely that numerous logical metadata changes will be committed by a single metadata page write. However, for physical metadata there is no such locality, as the physical metadata is ordered by randomly distributed tokens (e.g., address X's physical metadata may map to a metadata page completely unrelated to the metadata page for address X+1). If there is a total of Y such metadata pages, the probability of two consecutive logical addresses being in the same metadata page is 1/Y, so each metadata page write will likely commit only a single change.

As a result, if the reference counts associated with physical blocks were to be updated in the same orderly manner that the range of logical addresses are copied, the performance achieved for updating of the reference counts would be poor relative to that achieved for the copy of the range of logical addresses. Illustrative embodiments solve this problem by decoupling the copy of the range of logical addresses from the corresponding updates to the reference counts associated with the content-based signatures for the corresponding the physical blocks.

The example process described above is executed at least in part utilizing control logic instances 400, 406C and 406R of the respective storage node processing modules 108M, 108C and 108R of the storage system 105.

It is to be appreciated that the particular process steps are exemplary only and can be varied in other embodiments.

Also, the particular interconnection and signaling arrangements illustrated for processing modules 108C, 108R and 108M in FIG. 4 are presented by way of example only and can be varied in other embodiments.

In some embodiments, the control logic instances of these processing modules comprise respective portions of a reference count update engine of the storage controller 108.

It should also be understood that the particular arrangement of storage controller processing modules 108C, 108D, 108R and 108M as shown in the FIG. 1 embodiment is presented by way of example only. Numerous alternative arrangements of processing modules of a distributed storage controller may be used to implement functionality for reference count update logic in a clustered storage system in other embodiments.

Although illustratively shown as being implemented within the content addressable storage system 105, the storage controller 108 in other embodiments can be implemented at least in part within the computer system 101, in another system component, or as a stand-alone component coupled to the network 104.

The computer system 101 and content addressable storage system 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as VMs or Linux containers (LXCs), or combinations of both as in an arrangement in which Docker containers or other types of LXCs are configured to run on VMs.

As a more particular example, the storage controller 108 can be implemented in the form of one or more LXCs running on one or more VMs. Other arrangements of one or more processing devices of a processing platform can be used to implement the storage controller 108. Other portions of the system 100 can similarly be implemented using one or more processing devices of at least one processing platform.

The computer system 101 and the content addressable storage system 105 may be implemented on respective distinct processing platforms, although numerous other arrangements are possible. For example, in some embodiments at least portions of the computer system 101 and the content addressable storage system 105 are implemented on the same processing platform. The content addressable storage system 105 can therefore be implemented at least in part within at least one processing platform that implements at least a subset of the compute nodes 102.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the cluster reside in one or more other data centers in one or more other geographic locations that are potentially remote from the first geographic location. Thus, it is possible in some implementations of the system 100 for different ones of the compute nodes 102 to reside in different data centers than the content addressable storage system 105. Numerous other distributed implementations of one or both of the computer system 101 and the content addressable storage system 105 are possible. Accordingly, the content addressable storage system 105 can also be implemented in a distributed manner across multiple data centers.

It is to be appreciated that these and other features of illustrative embodiments are presented by way of example only and should not be construed as limiting in any way.

Accordingly, different numbers, types and arrangements of system components such as computer system 101, compute nodes 102, network 104, content addressable storage system 105, storage devices 106, storage controller 108 and storage nodes 115 and 120 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations. For example, as indicated previously, in some illustrative embodiments a given content addressable storage system or other type of storage system with functionality for reference count update logic can be offered to cloud infrastructure customers or other users as a PaaS offering.

Figure 7:
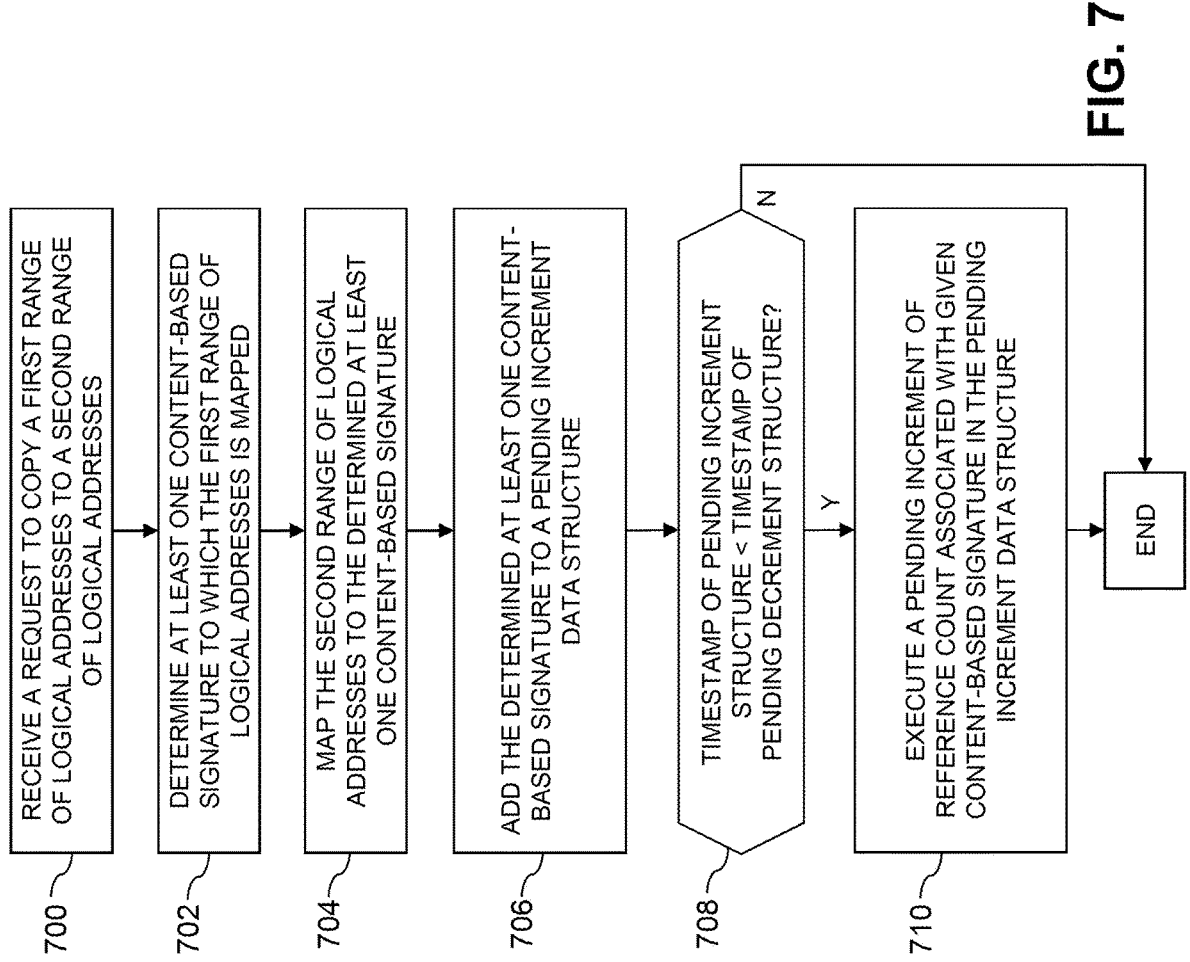
FIG. 7 is a flow diagram of a process for decoupling reference count updates in an illustrative embodiment.

Additional details of illustrative embodiments will now be described with reference to the flow diagram of FIG. 7. FIG. 7 more particularly shows an example of a reference count update process implemented in a storage system such as content addressable storage system 105 of the FIG. 1 embodiment. The content addressable storage system 105 may comprise a scale-out all-flash storage array such as an XtremIO™ storage array. A given such storage array can be configured to provide storage redundancy using well-known RAID techniques such as RAID 5 or RAID 6, although other storage redundancy configurations can be used.

The term "storage system" as used herein is therefore intended to be broadly construed and should not be viewed as being limited to content addressable storage systems or flash-based storage systems.

The storage devices of such a storage system illustratively implement a plurality of LUNs configured to store files, blocks, objects or other arrangements of data.

A given storage system can be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as VMs or LXCs, or combinations of both as in an arrangement in which Docker containers or other types of LXCs are configured to run on VMs.

As a more particular example, components of a distributed storage controller can each be implemented in the form of one or more LXCs running on one or more VMs. Other arrangements of one or more processing devices of a processing platform can be used to implement a distributed storage controller and/or its components. Other portions of the information processing system 100 can similarly be implemented using one or more processing devices of at least one processing platform.

The term "processing platform" as used herein is intended to be broadly construed so as to encompass, by way of illustration and without limitation, multiple sets of processing devices and associated storage systems that are configured to communicate over one or more networks.

The operation of the information processing system 100 will now be further described with reference to the flow diagram of the illustrative embodiment of FIG. 7. The process as shown includes steps 700 through 710 and is suitable for use in the system 100 but is more generally applicable to other types of information processing systems each comprising one or more storage systems. The steps are illustratively performed by cooperative interaction of control logic instances of processing modules of a distributed storage controller. A given such storage controller can therefore comprise a distributed storage controller implemented in the manner illustrated in FIGS. 1 and 4.

At 700, a request to copy a first range of logical addresses to a second range of logical addresses may be received, for example, from a host device by storage controller 108. In some embodiments, the request may, for example, include an identification of a range of source LBAs to copy and a range of target LBAs that will receive the copy.

At 702, the storage controller 108 may determine at least one content-based signature corresponding to at least one physical block to which the first range of logical addresses is mapped, for example, using the A2H and HMD mapping tables.

At 704, the storage controller 108 may map the second range of logical addresses to the determined at least one content-based signature, for example, by associating the second range of logical addresses with the at least one content-based signature in the A2H mapping table.

At 706, the storage controller 108 may add the at least one content-based signature to a pending increment page, e.g., increment page 600 or a combined increment/decrement page. This may indicate that an increment of the corresponding reference count is pending for the determined at least one content-based signature.

At 708, the storage controller 108 may determine whether a timestamp 604 associated with a pending increment page 600, or a particular content-based signature added to the pending increment page 600, is less than the timestamp 504 associated with a pending decrement page 500, or content-based signature added to the pending decrement page. In some illustrative embodiments, the timestamp 604 associated with a pending increment page 600 may be the earliest time that a content-based signature was added to that data structure. In some illustrative embodiments, the timestamp 504 associated with the pending decrement page 500 may be the latest time that a content-based signature was added to that data structure. If the timestamp 604 associated with a pending increment page 600 is not less than the timestamp 504 associated with a pending decrement page 500, the process ends.

At 710, if the timestamp 604 associated with a pending increment page 600 is less than the timestamp 504 associated with a pending decrement page 500, e.g., content-based signatures associated with pending increment operations were added to the pending increment page 600 before the last content-based signature associated with pending decrement operations was added to the pending decrement page 600, the storage controller 108 executes the pending increments of the reference count associated with at least one of the content-based signatures in the pending increment page 600. With reference also to FIG. 10, in some embodiments, the execution of the pending increment found in step 710 may comprise steps 1000 and 1002. At 1000, the storage controller 108 determines that a pending decrement of the reference count associated with the at least one content-based signature is included in the pending decrement data structure. At 1002, the storage controller 108 removes the at least one content-based signature from both the pending increment data structure and the pending decrement data structure without incrementing or decrementing the reference count corresponding to the at least one content-based signature.

In some embodiments, each content-based signature added to the increment page 600, decrement page 500, or a combined increment/decrement page, may have it's own individual timestamp where, for example, the individual timestamps of the content-based signatures may be compared to determine whether an increment operations should be performed before one or more decrement operations. For example, an increment operation associated with a content-based signature that was added to the increment page 600 or combined increment/decrement page may be executed if the individual timestamp for the content-based signature is earlier than one or more individual timestamps associated with content-based signatures added to the decrement page 500 or combined increment/decrement page. In some embodiments, the increment operation may be executed before any of the decrement operations so long as the individual timestamp for the associated content-based signature in the increment page 600 or combined increment/decrement page is earlier than at least one of the timestamps associated with the content-based signatures found in the decrement page 500 or combined increment/decrement page.

Different instances of the FIG. 7 process may be performed for respective different instances of reference count updates for different portions of a storage system or different storage systems.

It is also to be appreciated that the FIG. 7 process and other features and functionality for reference count update logic as described above can be adapted for use with other types of information systems, including by way of example an information processing system in which the host devices and the storage system are both implemented on the same processing platform.

The particular processing operations and other system functionality described in conjunction with the flow diagram of FIG. 7 are presented by way of illustrative example only and should not be construed as limiting the scope of the disclosure in any way. Alternative embodiments can use other types of processing operations for implementing reference count update logic. For example, the ordering of the process steps may be varied in other embodiments, or certain steps may be performed at least in part concurrently with one another rather than serially. Also, one or more of the process steps may be repeated periodically, or multiple instances of the process steps can be performed in parallel with one another in order to implement a plurality of different reference count update processes for respective different storage systems or portions thereof within a given information processing system.

Functionality such as that described in conjunction with the flow diagram of FIG. 7 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, a storage controller, such as storage controller 108, that is configured to control performance of one or more steps of the FIG. 7 process can be implemented as part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. The storage controller 108, as well as other system components, may be implemented at least in part using processing devices of such processing platforms. For example, in a distributed implementation of the storage controller 108, respective distributed modules of such a storage controller can be implemented in respective LXCs running on respective ones of the processing devices of a processing platform.

In some embodiments, the storage system comprises an XtremIO™ storage array suitably modified to incorporate reference count update techniques as disclosed herein.

As described previously, in the context of an XtremIO™ storage array, the control modules 108C, data modules 108D, routing modules 108R and management module(s) 108M of the distributed storage controller 108 in system 100 illustratively comprise C-modules, D-modules, R-modules and SYM module(s), respectively. These exemplary processing modules of the distributed storage controller 108 can be configured to implement reference count update functionality in accordance with the FIG. 7 process.

The reference count update techniques implemented in the embodiments described above can be varied in other embodiments. For example, different types of process operations can be used in other embodiments.

In addition, the above-described functionality associated with C-module, D-module, R-module and SYM module components of an XtremIO™ storage array can be incorporated into other processing modules or components of a centralized or distributed storage controller in other types of storage systems.

Illustrative embodiments of content addressable storage systems or other types of storage systems with functionality for reference count updates as disclosed herein can provide a number of significant advantages relative to conventional arrangements.

For example, some embodiments can advantageously provide highly efficient copying of a range of LBAs, for example, by in the storage system without having a metadata burst.

This is achieved in some embodiments by decoupling the metadata updates, e.g., increments and decrements of reference counts associated with content-based signatures correspond to physical blocks, from the copying of a source range of LBAs to a target range of LBAs in a manner that permits the reference counts to be updated without using a synchronous metadata burst, thereby avoiding the inefficiencies of conventional tightly coupled arrangements for copy operations. Storage system performance is therefore significantly improved, for example, since system resource usage for updating the reference counts may be spread out over a longer period of time or performed during periods where other resource usage in the system is relatively low instead of forcing the metadata update of the reference counts as a single burst in synchronization with the copy operation itself.

While described herein with reference to copying a range of LBAs, any other reference count update may be decoupled in the manner described herein to provide the advantages of an asynchronous reference count update operation divorced from the underlying host request.

These and other embodiments include clustered storage systems comprising storage controllers that are distributed over multiple storage nodes. Similar advantages can be provided in other types of storage systems.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as storage system 105, or portions thereof, are illustratively implemented for use by tenants of such a multi-tenant environment.

As mentioned previously, cloud infrastructure as disclosed herein can include cloud-based systems such as AWS, GCP and Microsoft Azure. Virtual machines provided in such systems can be used to implement at least portions of one or more of a computer system and a content addressable storage system in illustrative embodiments. These and other cloud-based systems in illustrative embodiments can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms utilized to implement host devices and storage systems with metadata loading control functionality will now be described in greater detail with reference to FIGS. 8 and 9. Although described in the context of system 100, these platforms may also be used to implement at least portions of other information processing systems in other embodiments.

Figure 8:
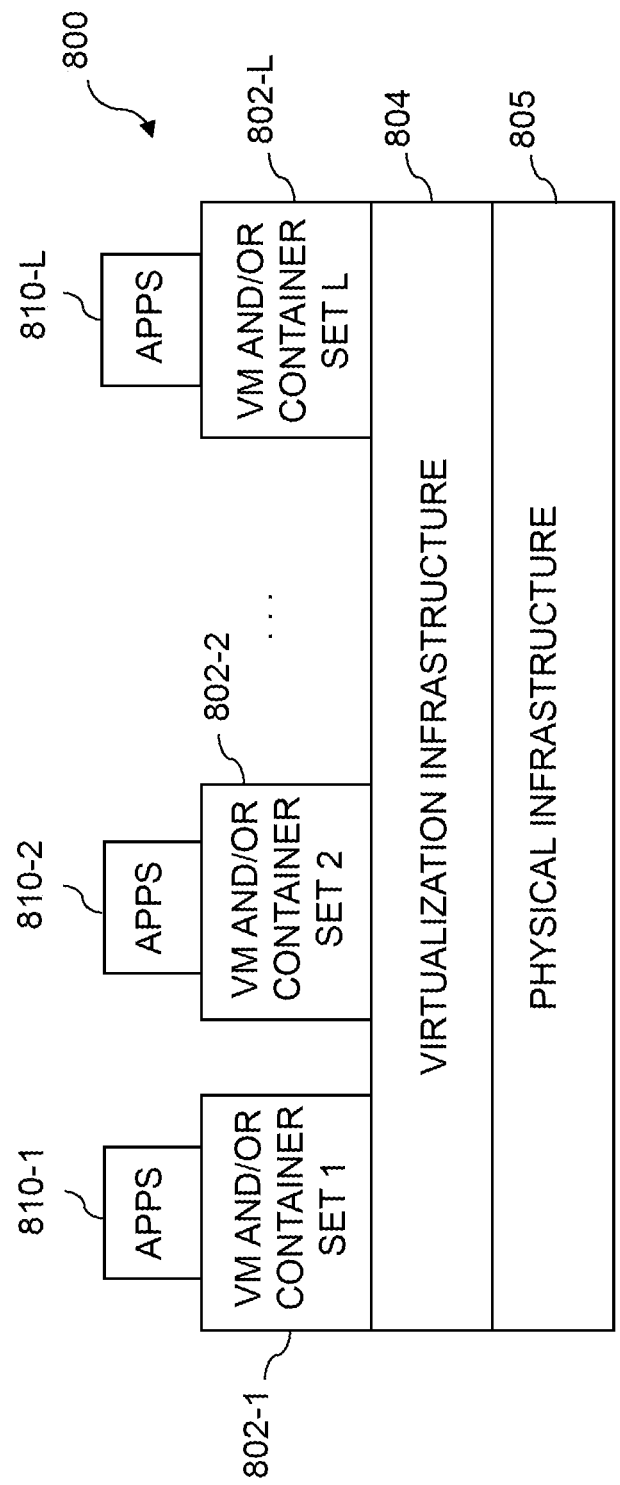
FIGS. 8 and 9 show examples of processing platforms that may be utilized to implement at least a portion of an information processing system in illustrative embodiments.
Figure 9:
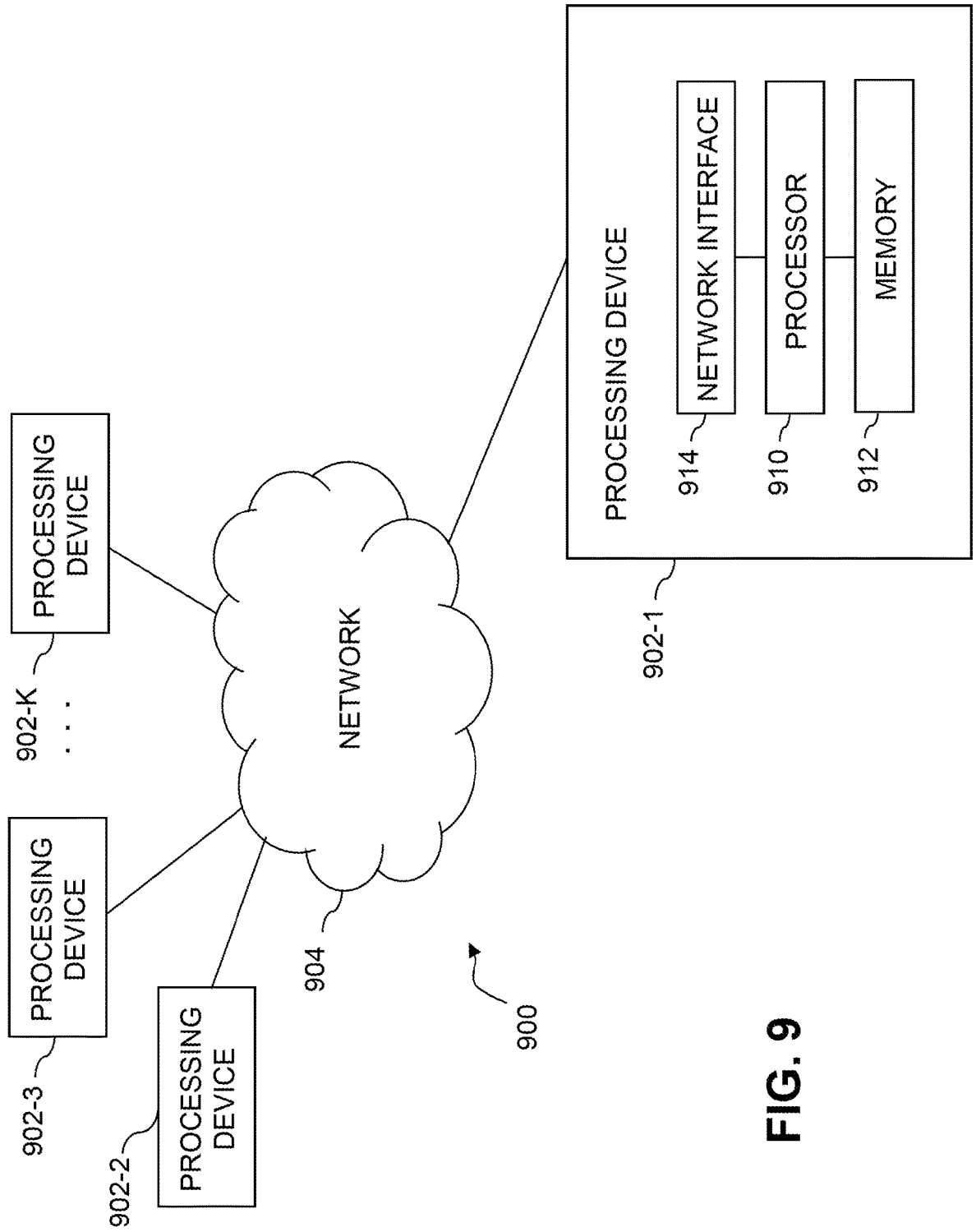

FIG. 8 shows an example processing platform comprising cloud infrastructure 800. The cloud infrastructure 800 comprises a combination of physical and virtual processing resources that may be utilized to implement at least a portion of the information processing system 100. The cloud infrastructure 800 comprises multiple virtual machines (VMs) and/or container sets 802-1, 802-2, . . . 802-L implemented using virtualization infrastructure 804. The virtualization infrastructure 804 runs on physical infrastructure 805, and illustratively comprises one or more hypervisors and/or operating system level virtualization infrastructure. The operating system level virtualization infrastructure illustratively comprises kernel control groups of a Linux operating system or other type of operating system.

The cloud infrastructure 800 further comprises sets of applications 810-1, 810-2, . . . 810-L running on respective ones of the VMs/container sets 802-1, 802-2, . . . 802-L under the control of the virtualization infrastructure 804. The VMs/container sets 802 may comprise respective VMs, respective sets of one or more containers, or respective sets of one or more containers running in VMs.

In some implementations of the FIG. 8 embodiment, the VMs/container sets 802 comprise respective VMs implemented using virtualization infrastructure 804 that comprises at least one hypervisor. Such implementations can provide metadata loading control functionality of the type described above for one or more processes running on a given one of the VMs. For example, each of the VMs can implement metadata loading control functionality for one or more processes running on that particular VM.

An example of a hypervisor platform that may be used to implement a hypervisor within the virtualization infrastructure 804 is the VMware® vSphere® which may have an associated virtual infrastructure management system such as the VMware® vCenter™. The underlying physical machines may comprise one or more distributed processing platforms that include one or more storage systems.

In other implementations of the FIG. 8 embodiment, the VMs/container sets 802 comprise respective containers implemented using virtualization infrastructure 804 that provides operating system level virtualization functionality, such as support for Docker containers running on bare metal hosts, or Docker containers running on VMs. The containers are illustratively implemented using respective kernel control groups of the operating system. Such implementations can provide metadata load control functionality of the type described above for one or more processes running on different ones of the containers. For example, a container host device supporting multiple containers of one or more container sets can implement one or more instances of metadata load control logic for use in loading metadata into cache during a restart process.

As is apparent from the above, one or more of the processing modules or other components of system 100 may each run on a computer, server, storage device or other processing platform element. A given such element may be viewed as an example of what is more generally referred to herein as a "processing device." The cloud infrastructure 800 shown in FIG. 8 may represent at least a portion of one processing platform. Another example of such a processing platform is processing platform 900 shown in FIG. 9.

The processing platform 900 in this embodiment comprises a portion of system 100 and includes a plurality of processing devices, denoted 902-1, 902-2, 902-3, . . . 902-K, which communicate with one another over a network 904.

The network 904 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 902-1 in the processing platform 900 comprises a processor 910 coupled to a memory 912.

The processor 910 may comprise a microprocessor, a microcontroller, an application-specific integrated circuit (ASIC), a field-programmable gate array (FPGA) or other type of processing circuitry, as well as portions or combinations of such circuitry elements.

The memory 912 may comprise random access memory (RAM), read-only memory (ROM), flash memory or other types of memory, in any combination. The memory 912 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the metadata load control functionality of one or more components of a host device or storage system as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, host devices, storage systems, storage nodes, storage devices, storage controllers, metadata load control processes and associated control logic. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
a content addressable storage system comprising a plurality of storage devices and an associated storage controller, the storage controller being configured:
to implement a logical storage layer of the content addressable storage system by mapping logical addresses associated with user data pages to content-based signatures respectively derived from a content of those user data pages;
to implement a physical storage layer of the content addressable storage system by mapping the content-based signatures to respective physical blocks in the storage devices where the corresponding user data pages are stored;
to implement a pending increment data structure associated with the storage controller, the pending increment data structure comprising a first plurality of entries, each entry in the pending increment data structure being configured to store a content-based signature that is mapped in the physical storage layer to a physical block for which an increment of a corresponding reference count is pending, each corresponding reference count comprising an indication of a number of logical addresses that are mapped to the corresponding content-based signature in the logical storage layer; and
to implement a pending decrement data structure associated with the storage controller, the pending decrement data structure comprising a second plurality of entries, each entry in the pending decrement data structure being configured to store a content-based signature that is mapped in the physical storage layer to a physical block for which a decrement of a corresponding reference count is pending;
to receive a request to copy user data pages associated with a first range of logical addresses to a second range of logical addresses;
to determine a content-based signature corresponding to at least a portion of the first range of logical addresses based at least in part on the mapping of the logical storage layer;
to map at least a portion of the second range of logical addresses to the determined content-based signature in the logical storage layer;
to add the determined content-based signature to a first entry of the pending increment data structure;
to determine that the pending decrement data structure comprises a second entry comprising the determined content-based signature;
to execute a pending decrement of the reference count corresponding to the determined content-based signature based at least in part on the determination that the pending decrement data structure comprises the second entry comprising the determined content-based signature, the execution of the pending decrement comprising:
determining that a given set of entries of the first plurality of entries of the pending increment data structure each comprise the determined content-based signature;
determining that a first timestamp of the pending increment data structure that corresponds to each entry in the given set of entries is earlier than a second timestamp of the pending decrement data structure that corresponds to an entry of the pending decrement data structure that comprises the determined content-based signature;
executing at least one pending increment of the reference count corresponding to at least one entry in the given set of entries based at least in part on the determination that the first timestamp is earlier than the second timestamp; and
executing the decrement of the reference count corresponding to the second entry in the pending decrement data structure that comprises the determined content-based signature after the execution of the at least one pending increment;
wherein the storage controller is implemented using at least one processing device comprising a processor coupled to a memory.

2. The apparatus of claim 1, wherein the pending increment data structure and the pending decrement data structure are the same data structure.

3. The apparatus of claim 1, wherein the first timestamp of the pending increment data structure represents a time at which the determined content-based signature was added to an entry of the given set of entries of the pending increment data structure.

4. The apparatus of claim 3, wherein the first timestamp of the pending increment data structure represents an earliest time at which the determined content-based signature was added to one of the given set of entries in the pending increment data structure.

5. The apparatus of claim 4, wherein:
the determined content-based signature was added to a given entry of the given set of entries of the pending increment data structure later than the second timestamp;
executing the at least one pending increment of the reference count corresponding to the at least one entry in the given set of entries comprises executing the pending increments of the reference count corresponding to each entry in the given set of entries including the given entry; and
executing the decrement of the reference count corresponding to the second entry in the pending decrement data structure that comprises the determined content-based signature after execution of the at least one pending increment comprises executing the decrement of the reference count corresponding to the second entry in the pending decrement data structure that comprises the determined content-based signature after execution of the given entry.

6. The apparatus of claim 3, wherein the second timestamp of the pending decrement data structure represents a time at which the determined content-based signature was added to an entry of the pending decrement data structure.

7. The apparatus of claim 6, wherein the second timestamp of the pending decrement data structure represents a latest time at which the determined content-based signature was added to an entry of the pending decrement data structure.

8. The apparatus of claim 1, wherein:
executing the at least one pending increment of the reference count corresponding to the at least one entry in the given set of entries comprises executing the pending increments of the reference count corresponding to each entry in the given set of entries; and
the execution of a given pending increment of the plurality of pending increments comprises: removing the determined content-based signature from both a given entry corresponding to the given pending increment in the pending increment data structure and the second entry comprising the determined content-based signature in the pending decrement data structure without incrementing or decrementing the reference count corresponding to the determined content-based signature.

9. A method comprising:

receiving a request to copy user data pages associated with a first range of logical addresses to a second range of logical addresses;

determining a content-based signature corresponding to at least a portion of the first range of logical addresses based at least in part on a mapping of a logical storage layer of a content addressable storage system, the content addressable storage system comprising a plurality of storage devices and an associated storage controller, the storage controller being configured:

to implement the logical storage layer of the content addressable storage system by mapping logical addresses associated with user data pages to content-based signatures respectively derived from a content of those user data pages;

to implement a physical storage layer of the content addressable storage system by mapping the content-based signatures to respective physical blocks in the storage devices where the corresponding user data pages are stored;

to implement a pending increment data structure associated with the storage controller, the pending increment data structure comprising a first plurality of entries, each entry in the pending increment data structure being configured to store a content-based signature that is mapped in the physical storage layer to a physical block for which an increment of a corresponding reference count is pending, each corresponding reference count comprising an indication of a number of logical addresses that are mapped to the corresponding content-based signature in the logical storage layer; and to implement a pending decrement data structure associated with the storage controller, the pending decrement data structure comprising a second plurality of entries, each entry in the pending decrement data structure being configured to store a content-based signature that is mapped in the physical storage layer to a physical block for which a decrement of a corresponding reference count is pending;

mapping at least a portion of the second range of logical addresses to the determined content-based signature in the logical storage layer;

adding the determined content-based signature to a first entry of the pending increment data structure;

determining that the pending decrement data structure comprises a second entry comprising the determined content-based signature;

executing a pending decrement of the reference count corresponding to the determined content-based signature based at least in part on the determination that the pending decrement data structure comprises a second entry comprising the determined content-based signature, the execution of the pending decrement comprising:

determining that a given set of entries of the first plurality of entries of the pending increment data structure each comprise the determined content-based signature;

determining that a first timestamp of the pending increment data structure that corresponds to each entry in the given set of entries is earlier than a second timestamp of the pending decrement data structure that corresponds to an entry of the pending decrement data structure that comprises the determined content-based signature;

executing at least one pending increment of the reference count corresponding to at least one entry in the given set of entries based at least in part on the determination that the first timestamp is earlier than the second timestamp; and executing the decrement of the reference count corresponding to the second entry in the pending decrement data structure that comprises the determined content-based signature after the execution of the at least one pending increment;

wherein the method is implemented by at least one processing device comprising a processor coupled to a memory.

10. The method of claim 9, wherein the first timestamp of the pending increment data structure represents a time at which the determined content-based signature was added to an entry of the given set of entries of the pending increment data structure.

11. The method of claim 10, wherein the second timestamp of the pending decrement data structure represents a time at which the determined content-based signature was added to an entry of the pending decrement data structures;

wherein the second timestamp of the pending decrement data structure represents a latest time at which the determined content-based signature was added to an entry of the pending decrement data structure.

12. The method of claim 10, wherein the first timestamp of the pending increment data structure represents an earliest time at which the determined content-based signature was added to one of the given set of entries in the pending increment data structure.

13. The method of claim 12, wherein:

the determined content-based signature was added to a given entry of the given set of entries of the pending increment data structure later than the second timestamp;

executing the at least one pending increment of the reference count corresponding to the at least one entry in the given set of entries comprises executing the pending increments of the reference count corresponding to each entry in the given set of entries including the given entry; and executing the decrement of the reference count corresponding to the second entry in the pending decrement data structure that comprises the determined content-based signature after execution of the at least one pending increment comprises executing the decrement of the reference count corresponding to the second entry in the pending decrement data structure that comprises the determined content-based signature after execution of the given entry.

14. The method of claim 9, wherein:

executing the at least one pending increment of the reference count corresponding to the at least one entry in the given set of entries comprises executing the pending increments of the reference count corresponding to each entry in the given set of entries; and the execution of a given pending increment of the plurality of pending increments comprises removing the determined content-based signature from a given entry corresponding to the given pending increment in the pending increment data structure and the second entry comprising the determined content-based signature in the pending decrement data structure without incrementing or decrementing the reference count corresponding to the determined content-based signature.

15. A computer program product comprising a non-transitory processor-readable storage medium having stored therein program code of one or more software programs, wherein the program code when executed by at least one processing device causes said at least one processing device to:
receive a request to copy user data pages associated with a first range of logical addresses to a second range of logical addresses;
determine a content-based signature corresponding to at least a portion of the first range of logical addresses based at least in part on a mapping of a logical storage layer of a content addressable storage system, the content addressable storage system comprising a plurality of storage devices and an associated storage controller, the storage controller being configured:
to implement the logical storage layer of the content addressable storage system by mapping logical addresses associated with user data pages to content-based signatures respectively derived from a content of those user data pages;
to implement a physical storage layer of the content addressable storage system by mapping the content-based signatures to respective physical blocks in the storage devices where the corresponding user data pages are stored;
to implement a pending increment data structure associated with the storage controller, the pending increment data structure comprising a first plurality of entries, each entry in the pending increment data structure being configured to store a content-based signature that is mapped in the physical storage layer to a physical block for which an increment of a corresponding reference count is pending, each corresponding reference count comprising an indication of a number of logical addresses that are mapped to the corresponding content-based signature in the logical storage layer; and
to implement a pending decrement data structure associated with the storage controller, the pending decrement data structure comprising a second plurality of entries, each entry in the pending decrement data structure being configured to store a content-based signature that is mapped in the physical storage layer to a physical block for which a decrement of a corresponding reference count is pending;
map at least a portion of the second range of logical addresses to the determined content-based signature in the logical storage layer;
add the determined content-based signature to a first entry of the pending increment data structure;
determine that the pending decrement data structure comprises a second entry comprising the determined content-based signature;
execute a pending decrement of the reference count corresponding to the determined content-based signature based at least in part on the determination that the pending decrement data structure comprises a second entry comprising the determined content-based signature, the execution of the pending decrement comprising:
determining that a given set of entries of the first plurality of entries of the pending increment data structure each comprise the determined content-based signature;
determining that a first timestamp of the pending increment data structure that corresponds to each entry in the given set of entries is earlier than a second timestamp of the pending decrement data structure that corresponds to an entry of the pending decrement data structure that comprises the determined content-based signature;
executing at least one pending increment of the reference count corresponding to at least one entry in the given set of entries based at least in part on the determination that the first timestamp is earlier than the second timestamp; and
executing the decrement of the reference count corresponding to the second entry in the pending decrement data structure that comprises the determined content-based signature after the execution of the at least one pending increment.

16. The computer program product of claim 15, wherein:
the first timestamp of the pending increment data structure represents a time at which the determined content-based signature was added to an entry of the given set of entries of the pending increment data structure.

17. The computer program product of claim 16, wherein:
the second timestamp of the pending decrement data structure represents a time at which the determined content-based signature was added to an entry of the pending decrement data structure;
the second timestamp of the pending decrement data structure represents a latest time at which the determined content-based signature was added to an entry of the pending decrement data structure.

18. The computer program product of claim 16, wherein the first timestamp of the pending increment data structure represents an earliest time at which the determined content-based signature was added to one of the given set of entries in the pending increment data structure.

19. The computer program product of claim 18, wherein:
the determined content-based signature was added to a given entry of the given set of entries of the pending increment data structure later than the second timestamp;
executing the at least one pending increment of the reference count corresponding to the at least one entry in the given set of entries comprises executing the pending increments of the reference count corresponding to each entry in the given set of entries including the given entry; and
executing the decrement of the reference count corresponding to the second entry in the pending decrement data structure that comprises the determined content-based signature after execution of the at least one pending increment comprises executing the decrement of the reference count corresponding to the second entry in the pending decrement data structure that comprises the determined content-based signature after execution of the given entry.

20. The computer program product of claim 15, wherein:
executing the at least one pending increment of the reference count corresponding to the at least one entry in the given set of entries comprises executing the pending increments of the reference count corresponding to each entry in the given set of entries; and the execution of a given pending increment of the plurality of pending increments comprises removing the determined content-based signature from both a given entry corresponding to the given pending increment in the pending increment data structure and the second entry comprising the determined content-based signature in the pending decrement data structure without incrementing or decrementing the reference count corresponding to the determined content-based signature.

* * * * *